E. L. SMITH ET AL
WRAPPING MACHINE
Jan. 26, 1932. Re. 18,341
Original Filed Sept. 26, 1921 7 Sheets-Sheet 1
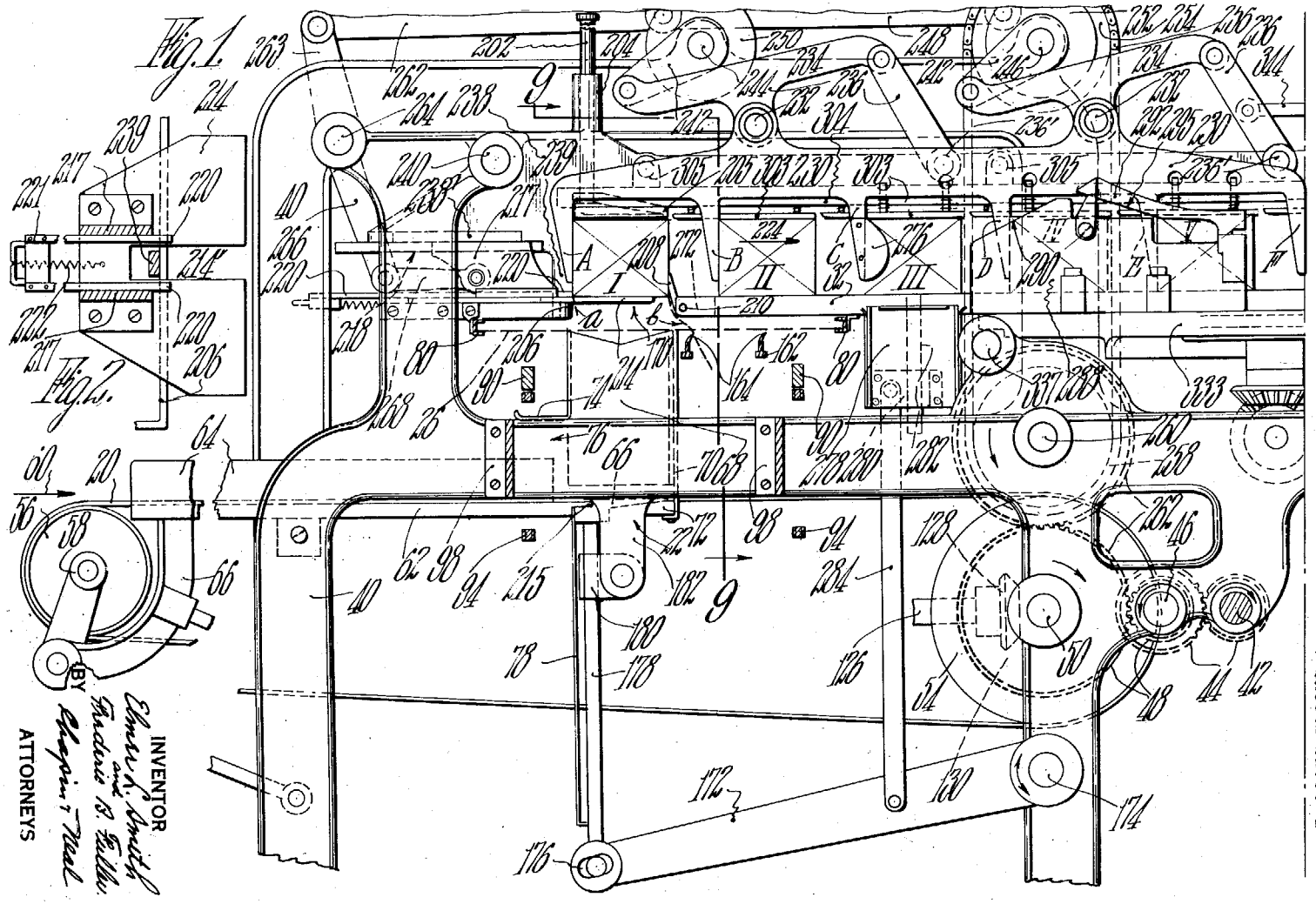
INVENTOR
Elmer L. Smith
and
Frederic B. Fuller
BY Chapin & Neal
ATTORNEYS E. L. SMITH ET AL
WRAPPING MACHINE
Jan. 26, 1932.
Original Filed Sept. 26, 1921
Re. 18,341
7 Sheets-Sheet 2
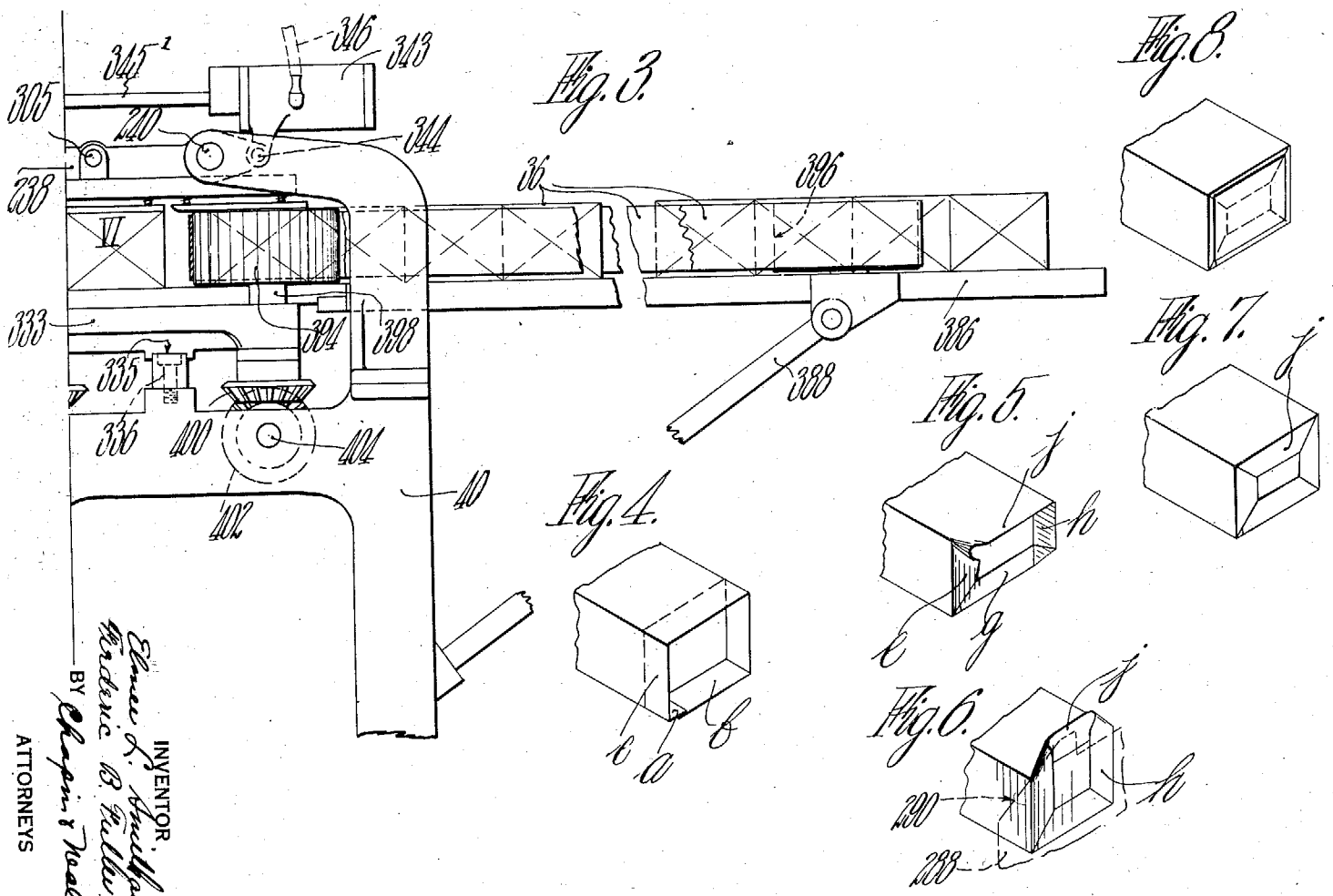

E. L. SMITH ET AL
WRAPPING MACHINE
Jan. 26, 1932.
Original Filed Sept. 26, 1921
Re. 18,341
7 Sheets-Sheet 3
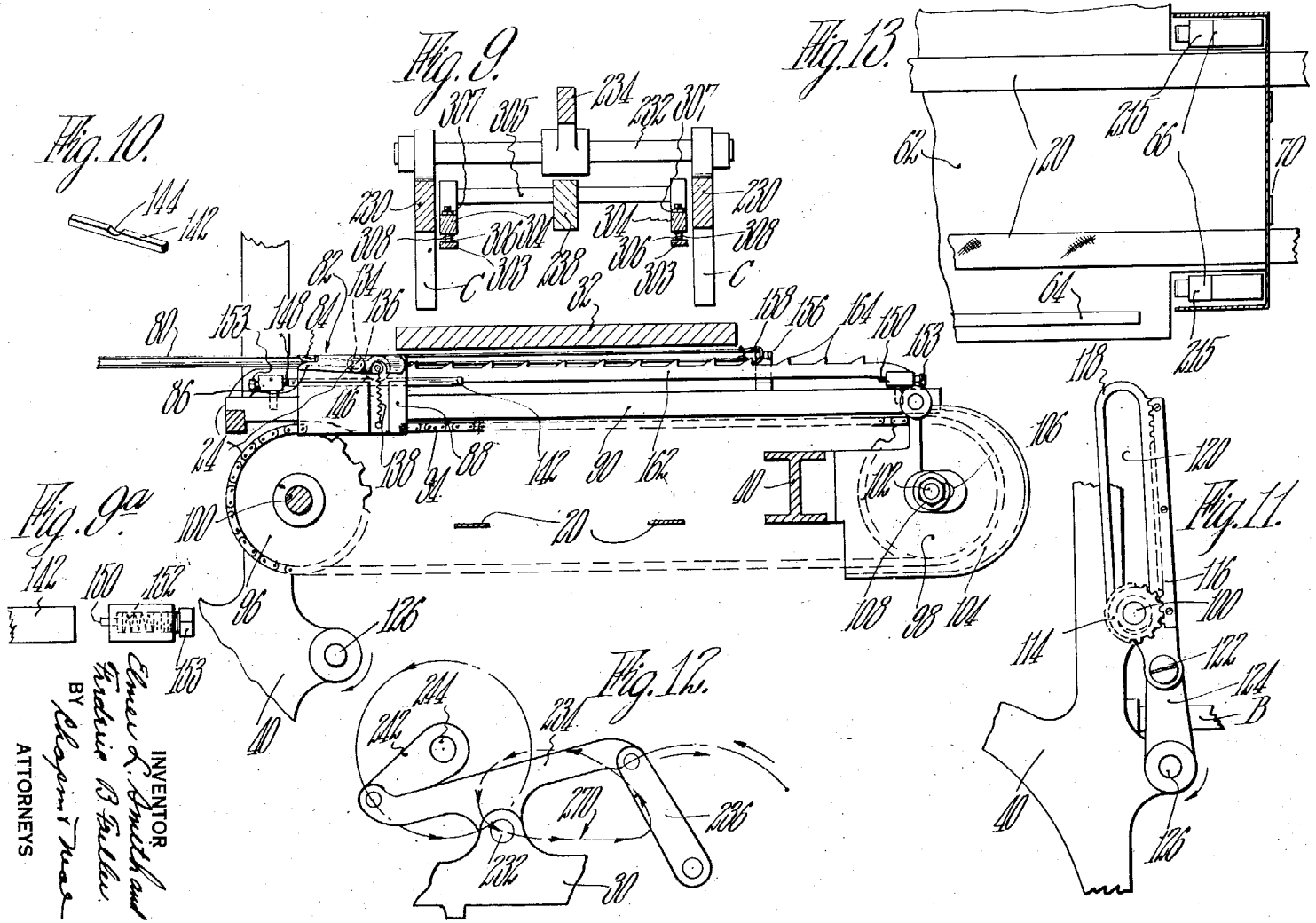
INVENTOR
Elmer L. Smith and
Frederic B. Fuller.
BY Chapin & Mac
ATTORNEYS E. L. SMITH ET AL
WRAPPING MACHINE
Jan. 26, 1932. Re. 18,341
Original Filed Sept. 26, 1921 7 Sheets-Sheet 4
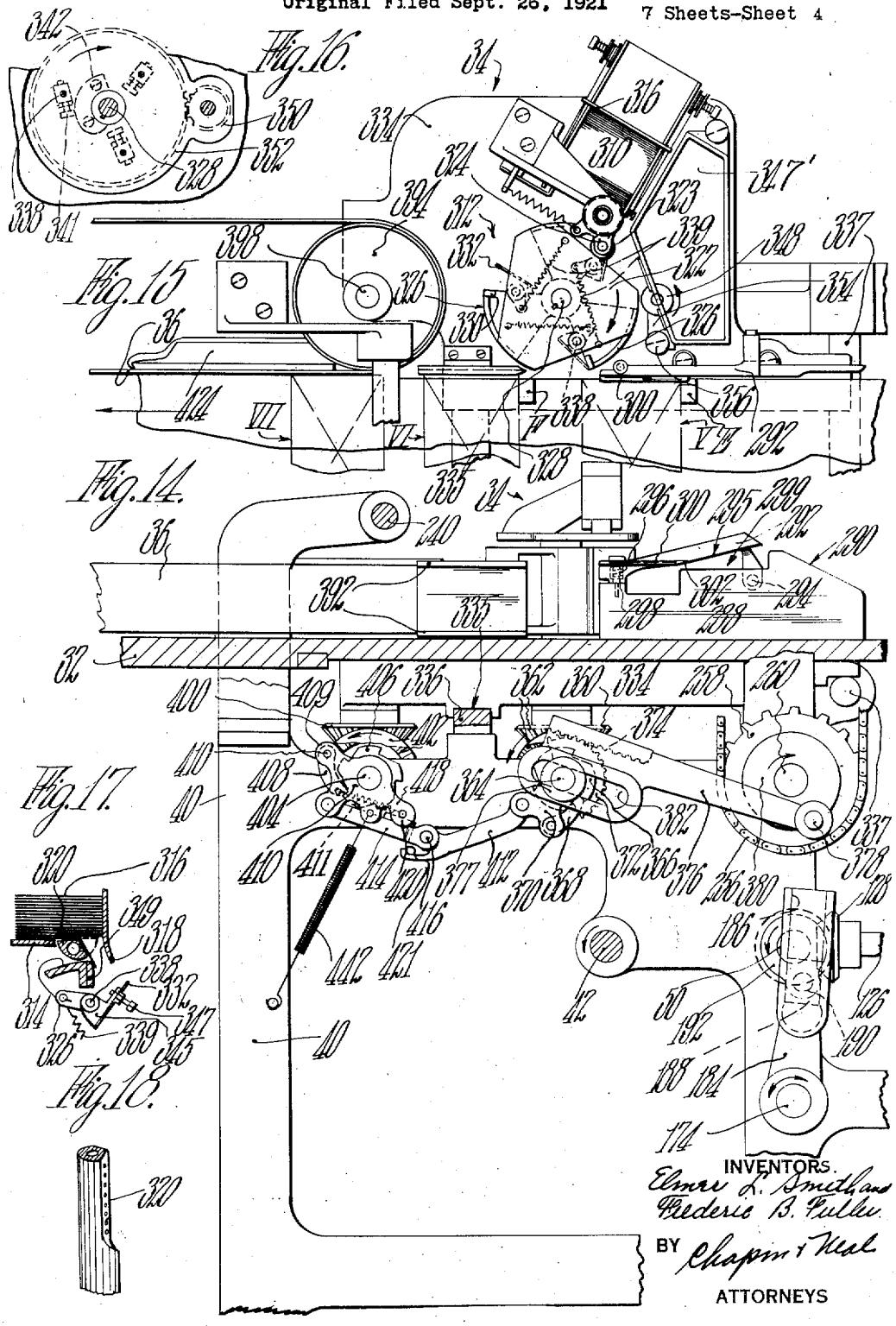
INVENTORS.
Elmer L. Smith and
Frederic B. Fuller
BY Chapin & Neal
ATTORNEYS

E. L. SMITH ET AL

WRAPPING MACHINE

Jan. 26, 1932.

Original Filed Sept. 26, 1921

Re. 18,341

7 Sheets-Sheet 5

INVENTORS
Elmer L. Smith and
Frederic B. Fuller
BY
Chapin & Neal
ATTORNEYS.

E. L. SMITH ET AL

WRAPPING MACHINE

Jan. 26, 1932. Re. 18,341

Original Filed Sept. 26, 1921

7 Sheets-Sheet 6

INVENTORS
Elmer L. Smith and
BY Frederic B. Fuller.
Chapin & Neal
ATTORNEYS

E. L. SMITH ET AL

WRAPPING MACHINE

Jan. 26, 1932.

Original Filed Sept. 26, 1921

Re. 18,341

7 Sheets-Sheet 7

INVENTORS
Elmer L. Smith and
Frederic B. Fuller.
BY
Chapin & Neal
ATTORNEYS

Reissued Jan. 26, 1932

Re. 18,341

UNITED STATES PATENT OFFICE

ELMER L. SMITH, OF LONGMEADOW, AND FREDERIC B. FULLER, OF SPRINGFIELD, MASSACHUSETTS, ASSIGNORS TO PACKAGE MACHINERY COMPANY, OF SPRINGFIELD, MASSACHUSETTS, A CORPORATION OF MASSACHUSETTS

WRAPPING MACHINE

Original No. 1,575,723, dated March 9, 1926, Serial No. 503,262, filed September 26, 1921. Application for reissue filed November 19, 1931. Serial No. 576,185.

In wrapping rectangular packages or cartons it is often desirable to apply labels or seals to the opposite ends of the package, after the wrapper has been placed thereon, these labels being useful for various purposes such as displaying advertising matter, trademarks or the like, or for trimming the package so as to add to the general attractiveness thereof. In addition, such labels perform the function of sealing the wrapper and maintaining or assisting in maintaining it in place upon the package.

One object of the present invention is to devise an improved machine for applying wrappers and labels to articles, which will effect a substantial saving in the amount of wrapping material used without permitting any portion of the article to be exposed or causing the wrapper to be any less effectively sealed.

To this end one feature of the invention consists in a machine for partially enclosing an article by a piece of wrapping material and then covering the unenclosed portion of said article by a separate piece of material acting as a seal. The method of wrapping performed by the machine is specifically described and claimed in the Smith and Fuller Patent 1,718,441, June 25, 1929.

In carrying out this method the wrappers are preliminarily cut to a size large enough to cover the sides of the article to be wrapped and to provide narrow extensions adapted to be folded over the end faces of the article in the form of flaps which are not wide enough to cover more than the marginal portions of said end faces. Labels or seals, approximately the shape and size of the end faces of the package, are then affixed to the ends of the article, overlapping the end flaps of the wrapper and constituting the sole covering, other than said end flaps, for the ends of the article. By this method wrappers may be employed which are considerably smaller than heretofore considered practical to use and thus a substantial saving of wrapping material is effected, while the labels serve to cover the ends of the package and to seal the wrapper in as effectual a manner as would be the case if a wrapper of the usual size were employed.

Another object of the invention is to reorganize wrapping machines of the general character above indicated and to provide certain new and useful improvements in their construction and mode of operation for the purpose of producing a machine of simplified and thoroughly practical construction which is capable of running smoothly at high speed, and which, in many other respects, is adapted to operate more efficiently and reliably than those heretofore produced.

To the accomplishment of this object and such others as may hereinafter appear, the invention resides in the features of construction and the combinations and arrangements of parts hereinafter described and particularly pointed out in the appended claims, the advantages of which will be apparent to those skilled in the art.

The invention will be best understood by reference to the accompanying drawings illustrating what is now considered to be the preferred embodiment thereof.

In the drawings,—

Fig. 1 is a view, in side elevation, of the improved machine, certain parts being omitted and others broken away or shown in section to facilitate the illustration of the more important features of the invention;

Fig. 2 is a detail plan view of one of the wrapper-folding members and certain devices associated therewith;

Fig. 3 is a side elevational view of a portion of the delivery end of the machine, this view together with Fig. 1 forming a side elevation, partly broken away, of the entire machine;

Figure 10:
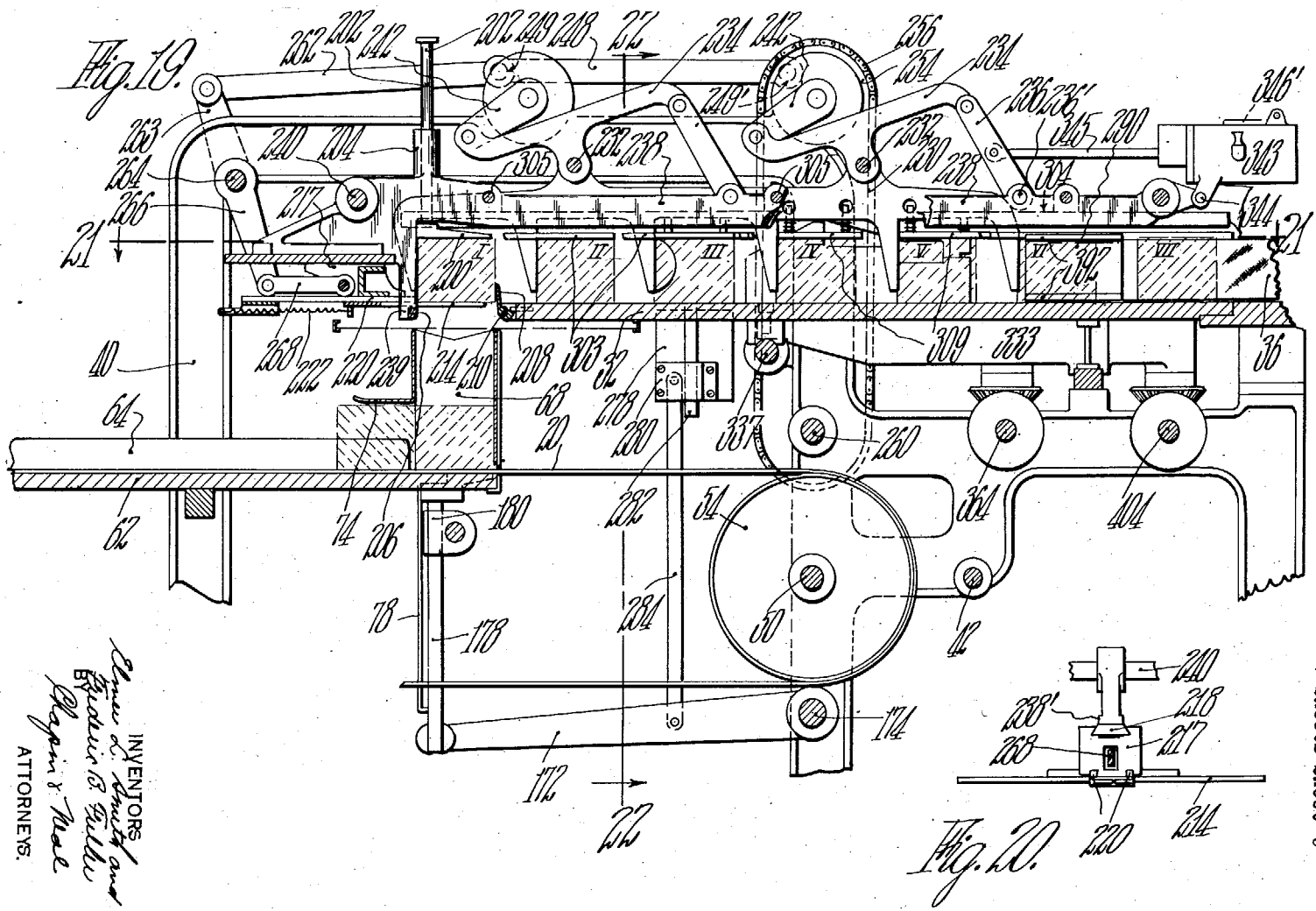
Figure 21:
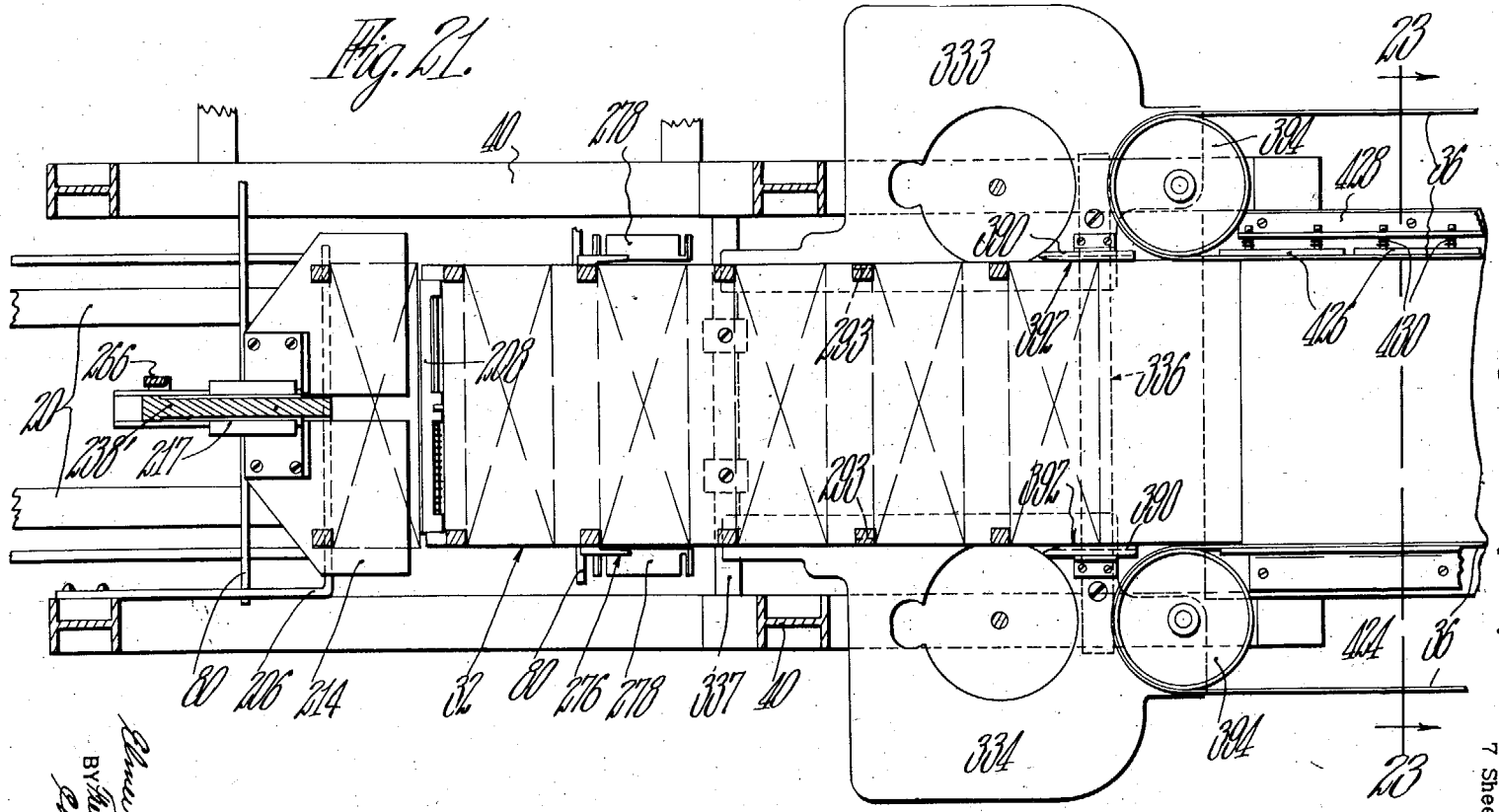
Figure 22:
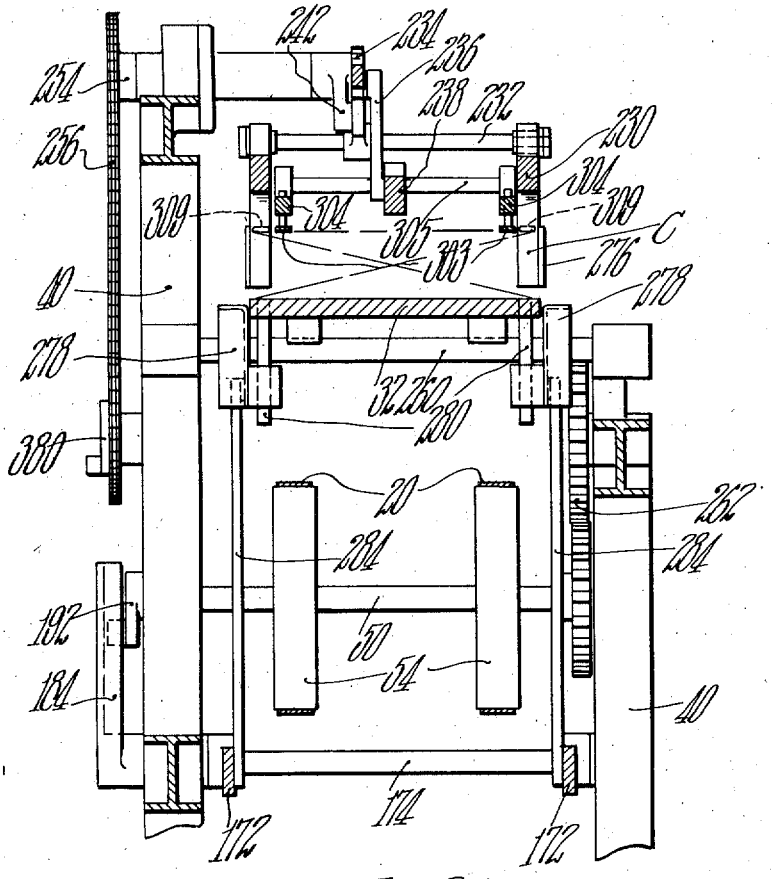
Figure 23:
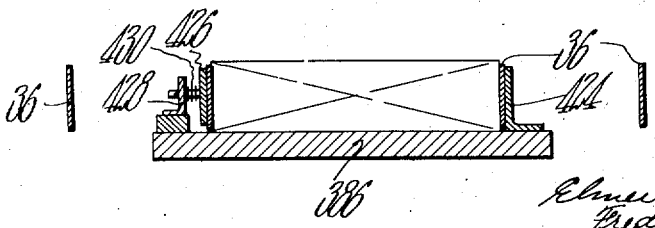

Figs. 4 to 8, inclusive, are perspective views of one end of an article illustrating various steps in the wrapping process;

Fig. 9 is a sectional view taken substantially on the line 9—9 of Fig. 1 and showing the mechanism for feeding and positioning the wrappers and also the transporters for advancing the articles during certain stages of the wrapping operation;

Fig. 9*a* is a view illustrating a detail of the wrapper feeding mechanism;

Fig. 10 is a detail perspective view of a portion of the wrapper-feeding mechanism;

Fig. 11 is a detail view of a portion of the means for actuating the wrapper-feeding mechanism, the parts being viewed from the receiving end of the machine;

Fig. 12 is a diagrammatic view illustrating the movements of the transporters;

Fig. 13 is a detail plan view of a portion of the mechanism for feeding the articles through the machine;

Fig. 14 is a view, partly in side elevation, of a portion of the opposite side of the machine from that shown in Fig. 1, this view illustrating particularly the mechanism for actuating the label-applying mechanism and the delivery conveyer;

Fig. 15 is a top plan view of a portion of the mechanism shown in Fig. 13 and illustrates particularly one of the label-applying devices;

Fig. 16 is a detail view, in horizontal section, taken on a plane which is below the label-applying drum shown in Fig. 14;

Fig. 17 is a fragmentary sectional view taken on a plane extending horizontally through the label-applying drum and the supply magazine;

Fig. 18 is a perspective view, partly broken away, of one of the suction tubes of the label-applying mechanisms;

Fig. 19 is a longitudinal sectional view of the greater part of the machine, the view being taken in a vertical plane midway between the side frames of the machine and being on a somewhat smaller scale than Fig. 1;

Fig. 20 is a detail view, partially in end elevation and partially in section of the parts shown in Fig. 2;

Fig. 21 is a sectional view taken substantially on the line 21—21 of Fig. 19;

Fig. 22 is a sectional view taken substantially on the line 22—22 of Fig. 19; and Fig. 23 is a detail sectional view on the line 23—23 of Fig. 21.

In the illustrated embodiment of the invention, the articles to be wrapped, in the present instance rectangular cartons, are received at one end of the machine upon a conveyer 20 (Fig. 1) consisting of one or more endless belts which advance the articles transversely to an elevator 22 as the latter periodically reaches its lowermost position. Prior to each upward movement of the elevator 22, a flat paper wrapper is applied, at one side of the machine, to wrapper feeding and positioning devices 24 (Fig. 9) and transferred by the latter to a position above the elevator 22 and across the path of movement of the articles thereon, as indicated by the dotted line 26 in Fig. 1, the wrapper overlying both sides and ends of the article. The article is then raised by the elevator to the position occupied by the article I in Fig. 1, where it is within the field of operations of a transporter 30 (Fig. 12). During the rise of the article in the elevator, the upper face of the article engages the wrapper, lifting it with the article and drawing it over the guiding faces hereinafter to be described which lay it smoothly against the opposite sides of the article. When the elevator has reached its uppermost position it immediately starts to descend leaving the article momentarily supported in the position of the article I. The wrapper then extends below the article, at both sides thereof, and a suitable device is actuated to fold the extension at the side adjacent the receiving end of the machine beneath the package and against the bottom face thereof. The transporter 30 then operates to advance the article, step-by-step and in a sidewise direction along a horizontal feed table 32. As the article is fed across the edge at the receiving end of the feed table 32, the unfolded downward extension of the wrapper is folded over the bottom face of the article and during the continued passage of the article across the feed table various devices operate to fold the end extensions of the wrapper against the end faces of the article. As the article approaches the delivery end of the feed table 32, the wrapping operation is completed by the application of labels to the opposite ends of the article. This is accomplished by means of two label-applying mechanisms which are arranged to cooperate with the opposite ends of the article, one of these mechanisms being indicated generally at 34 in Figs. 14 and 15. The wrapped and labeled articles are then introduced between a pair of belts 36 (Fig. 3) constituting a delivery conveyer and also means for applying endwise pressure to the articles to maintain the labels firmly in place during the setting of the glue or paste by means of which they are secured to the articles. The belts 36 are intermittently driven to slowly advance the packages so as to insure ample time for the glue to become set before the articles are finally discharged.

To render the machine capable of operating smoothly and efficiently at high speed, the use of cams, except in the label-applying mechanism, has been eliminated and continuous rotary motion has been, to a large extent, substituted for reciprocating or intermittent movements. In practice, the machine has been found to operate satisfactorily at an unusually high rate of speed with very little noise or vibration. The number of articles which have been wrapped per minute in the present machine is considerably greater than that wrapped by any machine of this character heretofore produced so far as the inventors are aware.

The various component mechanisms of the machine are supported by a frame comprising vertical side members 40 which are rigidly connected by suitable tie-rods. Extending transversely of the frame of the machine and mounted in suitable bearings carried thereby, is a horizontal drive-shaft 42 that is provided, at one end, with the usual fast and loose pulleys (not shown) whereby it is adapted for connection with any suitable source of power. A hand wheel may be provided at the opposite end of the drive-shaft 42 to facilitate the manual turning over of the mechanism in making adjustments or repairs. The drive-shaft 42 is connected through intermeshing spur gears 44 with a counter shaft 46 and the latter shaft is, in turn, connected through intermeshing spur gears 48 with a parallel shaft 50, the shafts 46 and 50 being suitably journaled adjacent their opposite ends in the side frame members 40. The gears 44 and 48 are proportioned to effect a substantial reduction of the speed of the driven shaft 50 below that of the driving shaft 42. The various operative parts of the machine derive their motion from the shaft 50 through the medium of power transmitting mechanism hereinafter to be described.

The articles to be wrapped are supplied to the receiving conveyer 20. As shown, the conveyer 20 consists of two endless belts (Figs. 1, 13, and 22) arranged edge to edge in spaced apart relationship and both passing over two pairs of pulleys 54 and 56. The pulleys 54 are fast upon the driven shaft 50 and the pulleys 56 are mounted to turn freely in bearings 58 at the receiving end of the machine. The upper stretches of the conveyer belts 20 travel in the direction of the arrow 60 (Fig. 1) across a supporting table 62 and between vertical guiding walls 64 which rise from said table. The table 62 is rigidly secured to the frame of the machine and carries at its forward end a bracket 66 supporting the bearings 58 for the pulley 56.

The articles operated upon, which in the present instance are packages or cartons of the usual slightly elongated rectangular form, are deposited transversely upon the upper stretch of the conveyer 20 and are advanced thereby, in a sidewise direction toward the elevator 22. The elevator 22 comprises a pair of rectangular platforms 66 (Figs. 1 and 13) which are vertically movable in unison within the walls of an elevator well 68 and are adapted to simultaneously engage the opposite ends of the article to be raised thereby. From an examination of Fig. 13 it will be observed that the two elevator platforms 66 are arranged closely adjacent the opposite longitudinal edges of the conveyer belt 20 and that said belt is narrower than the length of the articles which are arranged crosswise between the guiding walls 64. It will consequently be apparent that the opposite ends of the articles will project beyond the edges of the conveyer belts and will overlie the elevator platforms 68 when introduced into the elevator well.

The elevator well 68 consists of a four-sided rectangular tube-like structure that is rigidly supported by means of one or more uprights 70, the latter being secured at their lower extremities to a cross-bar 72 which is in turn rigidly secured in any suitable manner to the frame of the machine and serves to limit the downward movement of the elevator platforms 66. The elevator well 68 is constructed and arranged with its side walls closely adjacent the sides of the article upon the elevator platforms 66 so as to prevent displacement of the article as it is raised by the elevator. The lower portion of the wall at the forward side of the elevator well is turned outwardly and upwardly to form a guiding lip 74 and to produce an opening 76 below said lip through which the articles may be loaded upon the elevator platforms. The lip 74 engages the upper faces of the articles as they are about to enter the elevator well and serves to prevent possible upward displacement thereof. The articles are prevented from passing beyond the elevator by means of the rear wall of the elevator well.

The articles or packages are supplied at a sufficient rate to the continuously operating conveyer 20 and the latter is driven at such a speed as to continuously maintain a horizontal row of articles adjacent the elevator well 68. This row of articles is constantly urged, by the action of the conveyer, in a direction to advance the foremost article of the row through the opening 76 in the forward wall of the elevator well. After the article has been delivered upon the elevator platforms and the latter have risen above the horizontal plane of the row of articles on the conveyer 20, the row is prevented from advancing so as to feed an article into the well beneath the elevator platforms by means of buffers 78 consisting of vertical strips depending from the elevator platforms and movable vertically therewith. When the elevator again returns to its lowermost position, beneath the plane of the row on the conveyer 20, the row is again advanced to load another article upon the elevator platforms.

The wrappers for the articles are supplied to the machine in the form of flat sheets of paper. A vertical stack of such sheets may be suitably supported adjacent the farther side of the machine (Fig. 1) and any suitable form of sheet feeding means may be employed to feed the sheets edgewise from the stack and to introduce them, one at a time, to the wrapper feeding and positioning mechanism 24. An example of a sheet feeding mechanism suitable for thus supplying wrappers to the present machine is disclosed in United States Letters Patent No. 1,298,685, granted April 1, 1919, to H. O. Fischer and assigned to the Package Machinery Company.

Associated with the wrapper feeding and positioning mechanism 24 of the present machine is a pair of channel-shaped guiding and supporting members 80 (Figs. 1 and 9) rigidly secured to the under side of the feed table 32. These guiding and supporting members 80 extend transversely of the machine and are arranged with their channels opposed to receive and support the opposite edges of the wrapper sheets. The guiding members 80 extend outwardly beyond the wrapper feeding and positioning mechanism 24, as shown in Fig. 9, and the opposite edges of the sheets are introduced therein by the sheet feeding means which is employed to supply the sheets to the machine. The wrapper feeding and positioning mechanism 24 comprises a pair of gripper devices 82 each consisting of a fixed gripper jaw 84 and a movable gripper jaw 86, the latter adapted to cooperate with the former to grip the forward edges of the wrapper sheets. The two pairs of gripper jaws, only one of which is shown, are severally mounted upon carriages 88 which are adapted to reciprocate upon horizontal guide-bars 90 to advance the wrapper sheets into position above the packages to which they are supplied. The guide-bars 90 are rigidly secured in any suitable manner to the frame of the machine and, as shown, each bar is of rectangular cross-section to prevent the respective carriage 88 from turning as it reciprocates thereon.

To reciprocate the gripper devices 82, the carriages 88 are severally connected with the upper stretches of a pair of sprocket chains 94, each chain 94 passing over a pair of sprocket wheels 96 and 98. The sprocket wheel 96 is secured to a horizontal shaft 100 which extends longitudinally of the machine and is suitably journaled in bearings on one of the side frame members 40. The sprocket wheel 98 is mounted to turn upon an axle 102, the latter being supported at its opposite ends by bearing brackets 104 that are rigidly secured to the adjacent frame member 40. The ends of the brackets 104 are provided with slots 106, said slots being arranged to permit adjustment of the axle 102 towards and from the sprocket wheel 96 to take up slackness of the sprocket chain. To secure the axle 102 in adjusted position, nuts 108, which are threaded upon its opposite ends, may be tightened to bear against the adjacent sides of the bracket 104.

The shaft 100, together with the sprocket wheel 96 is rotated alternately in opposite directions by means of crank-actuated rack and pinion mechanism, best shown in Fig. 11. This mechanism comprises a pinion 114 fast on the forward end of the shaft 100 and a rack 116 meshing with said pinion. The rack 116 is secured to the side of an upright lever 118 which is provided with a longitudinal slot 120 through which the forward end of the shaft 100 extends. At its lower end, the lever 118 is connected by a crank-pin 122 with a crank-arm 124, the latter being carried at the forward end of a horizontal shaft 126 that is journaled in bearings on the frame of the machine. The shaft 126 extends longitudinally of the machine and, as shown in Figs. 1 and 14, the rear extremity of said shaft carries a bevel gear 128 which meshes with a bevel gear 130. As the shaft 126 and crank-arm 124 rotate, the lever 118 and the rack 116 carried thereby are reciprocated and shaft 100 and sprocket wheel 96 are oscillated alternately in opposite directions so that the sprocket chain 94 is caused to travel back and forth across the machine. The gripper carriages 88 are therefore reciprocated upon the guide-bars 90.

The movable gripper jaws 86 are actuated to cooperate with the fixed gripper jaws 84 to seize the wrappers prior to each feed movement of the gripper carriages 88 and the jaws 86 are actuated to release the wrappers just before the completion of the feed movements of the gripper carriages. The construction and mode of operation of each of the movable gripper jaws 86 is identical and these jaws are actuated by separate devices which are also the same in construction and mode of operation. Accordingly it will be necessary to describe in detail only one of said jaws together with its respective actuating means.

Referring to Fig. 9, the gripper jaw 86 therein shown is secured to a horizontal rock-shaft 134 which is mounted to turn freely in the gripper carriage 88, in order that said gripper jaw may cooperate with the fixed gripper jaw 84. Extending from the rock-shaft 134. forwardly of the jaw, is an arm 136 connected by a spring 138 with the carriage 88, the tension of the spring tending to rock the shaft 134 in a direction to hold the gripper jaw 86 in cooperative engagement with the fixed gripper jaw 84 so as to firmly grip a wrapper.

The gripper jaw 86 is auomatically swung downwardly away from the fixed jaw 84 to release the wrapper, and said jaw 86 is caused to swing upwardly to cooperate with the fixed jaw to grip the wrappers by means of mechanisms which will now be described.

The gripper actuating mechanism comprises a horizontal slide-rod 142 frictionally mounted in a longitudinal recess of said carriage 88 and extending from each side thereof so as to be carried back and forth with said carriage and yet be capable of sliding movement relative thereto. The slide-rod 142 is square in cross-section, as shown in Fig. 10, so that it cannot twist in the gripper carriage and the upper face of the slide-rod is provided with a notch 144 having a curved wall to be engaged by a roller 146 (Fig. 9) that is carried at the free end of the arm 136. The slide-rod 142 is adapted to be shifted longitudinally in the carriage 88 in one direction when the carriage reaches one end of its travel and in the opposite direction when the carriage reaches the opposite end of the travel to bring the notch 144 into position to be entered by the roller 146 so as to effect the closing of the gripper jaws and to cause the roller 146 to ride out of said notch into engagement with the upper face of the slide-rod and thereby to open the gripper jaws. For the purpose, one projecting end of the slide-rod 142 is adapted to be engaged by a stop 148 carried by one of the guide bars 90 at the side of the machine at which the wrappers are supplied, while the other projecting end of the slide-rod 142 is adapted to be engaged by a stop 150 carried by said guide bar at the opposite side of the machine. Both of the stops 148 and 150 are preferably constructed as indicated in Fig. 9*a*. As therein shown, the stop 150 is in the form of a plunger which protrudes from a suitable pocket containing a stiff spring 152 which backs up the plunger and permits it to yield slightly when engaged by the slide rod thus absorbing the shock and deadening the noise resulting from the impact of the rod against the stop. The spring 152 is backed up by a bolt 153 which may be adjusted to vary the compression of the spring.

As the gripper carriage 88 moves toward the side of the machine to which the wrappers are supplied, the gripper jaws are open, ready to receive the edge of a wrapper between them, the jaws being held open by the engagement of the roller 146 with the flat top face of the slide-rod 142, the notch 144 then being positioned to the left of the roller (viewing Fig. 9) and the left end of the slide-rod projecting considerably beyond the left end of the carriage. As the carriage 88 approaches the position in which it appears in Fig. 9, the left end of the slide-rod 142 engages the stop 148 and the movement of the slide-rod is arrested. The carriage continues a short distance however, so that when the limit of its movement in this direction is reached, the roller 146 is moved into the notch 144 by the action of the spring 138 and the gripper jaws are yieldingly closed upon the edge of the wrapper which is positioned in the channel-guides 82.

The gripper carriage then starts its wrapper feeding movement (toward the right in Fig. 9) and the gripper jaws are maintained closed upon the wrapper so as to advance it into position above the article upon the elevator. As the gripper carriage approaches the limit of its wrapper feeding movement, the right end of the slide-rod 142 strikes the stop 150, whereby the movement of the slide-rod is arrested while the continued movement of the gripper carriage causes the roller 146 to ride out of the notch 144 onto the upper face of the slide-rod so that the gripper jaws are positively opened, against the action of the spring 138, to release the wrapper.

In order that the wrapper shall be positioned in proper relation to the article to be wrapped it is necessary that the feed movement of each wrapper shall be stopped with accuracy when the wrapper reaches a certain definite position. It is found desirable to arrest the feed movement of the wrapper by bringing its advance edge into engagement with one or more stops which may be adjustably positioned in the line of feed of the wrapper sheets. To this end the gripper jaws are arranged to open somewhat before the gripper carriage completes its feed stroke and a pair of stops 156 one at each side of the feed mechanism, are located at proper points in the plane of the wrapper to engage the forward edge of the wrapper as it advances under momentum after being released by the gripper jaws, and to arrest the advance of the wrapper when it has reached the desired position. These stops 156 may be supported in any suitable manner with provision for adjustment in the direction of feed of the wrappers. Inasmuch as the machine is designed to operate at high speed the gripper carriages reciprocate rapidly so that the wrapper is under considerable momentum as it is released by the gripper jaws. To prevent the wrapper from rebounding after striking the stops 156 a control device 158 is associated with each stop 156.

Each control device 158 consists of a strip of thin spring steel which is bent into the curved shape illustrated in Fig. 9 to provide two opposed spring fingers having their opposite end portions in vertical alignment, and normally in yielding contact with one another. The extreme ends of the device 158 are curved outwardly, as shown, to facilitate the entrance between them of the advance edge of the wrapper. As the edge of the wrapper enters between the fingers of the control device 158 said fingers operate, by virtue of their frictional contact with the upper and lower sides of the wrapper, first to reduce somewhat the momentum of the wrapper, and then, after the wrapper has engaged the stops 156, to prevent the wrapper from rebounding so that it will be brought to rest with accuracy in the desired position. The stops 156 may be adjusted relatively to the control devices 158 so as to vary the distance traveled by the wrapper after it has encountered the frictional resistance of said control device and thereby to regulate the rate of movement of the wrapper when it actually engages the stops.

As the wrapper is advanced by the feed movement of the gripper devices 82 into position for application to the article to be wrapped, the opposite edges of the wrapper, which lie in the channel guides 80, are supported and guided by the latter while a part of the intermediate portion of the wrapper is supported by the upper edges of the walls of the elevator well.

While the wrapper is being fed, a line of paste is applied, by any suitable means (not shown), to the under side of the wrapper, adjacent the edge which extends toward the delivery end of the machine. As the elevator 22 rises and the article thereon engages the wrapper, the wrapper is raised thereby from its horizontal plane and its edges are withdrawn from the channel guides 80. As the edge of the wrapper at the right side of the article (viewing Fig. 1) is pulled out of its respective channel guide 80 this paste bearing portion of the wrapper tends to fall against various parts of the mechanism below it, and if this is not prevented, said parts will become coated with paste. To prevent this condition from occurring, two wrapper supporting and guiding bars 162 (Fig. 1) extend transversely across the machine in advance of the article and just below the plane occupied by the wrapper as it is being fed. These bars 162 support the portion of the wrapper at the side of the article and hold it away from other parts of the machine. In order that the line of paste shall not be rubbed off from the wrapper as the latter is drawn across the bars 162, the bars are formed with a series of upwardly projecting prongs 164, that are adapted to engage the wrapper. These prongs 164 provide point bearings which are well adapted to properly support the wrapper but which do not have any tendency to remove the paste therefrom. As shown in Fig. 9, the prongs 164 are advantageously beveled somewhat toward the front and to the delivery end of the machine to minimize the area of contact between the prongs and the paste carrying portion of the wrapper so that the wrapper will ride easily over the prongs during its feeding movement.

To facilitate the rapid operation of the machine it is desirable that there shall be no appreciable dwell of the gripper devices 82 after they have gripped a new wrapper and are about to reverse their direction of movement preparatory to feeding the wrapper into the machine. It is further desirable that a comparatively greater interval of time shall elapse after each of the gripper devices 82 have reached that portion of their feed stroke where the gripper jaws are released from the wrapper, and before the gripper devices, upon their return strokes, have again reached said point. By referring again to Fig. 11 it will be seen that the mechanism for actuating the sprocket chains 94 which reciprocate the gripper carriage 88 is designed to accomplish the above stated desirable results in the following manner: When the crank arm 124 is passing over dead center in the uppermost portion of its path of movement, substantially as shown in Fig. 11, the gripper carriages 88 are approximately at the limit of their idle or return strokes, i. e., in the position in which one of said carriages appear in Fig. 9. At this time a rapid reversal in the direction of movement of the gripper carriages is effected by reason of the fact that almost the entire amount of movement of the crank-pin 122 is then effective to impart endwise movement to the rack 116. Thus there is no unnecessary loss of time at this point in the wrapper feeding operation. When, however, the crank-pin 122 is approaching and passing beyond dead center in the lower portion of its orbit, a considerable portion of its travel then operates to swing the rack 116 about the shaft 100 substantially without endwise movement of the rack. As a result, the reversal in the direction of movement of the gripper carriages 88 is then much slower than at the opposite end of the stroke of the carriage and ample time is allowed for the wrapper to be withdrawn from the path of the gripper jaws before the gripper carriages get under way on their return movement. By thus varying the speed of reversal of the gripper carriages at opposite ends of the travel it is possible to shorten the overthrow or idle travel of the gripper carriages after releasing the wrapper and thus shorten the width of the machine.

After a wrapper has been positioned, as above described for application to the article upon the elevator 22, the elevator is raised to engage the wrapper and force the article, together with the portion of the wrapper engaged thereby, upwardly through a space 170 adjacent the receiving end of the feed table 32. To this end, the elevator platforms 66 are raised and lowered in unison by the oscillation of a pair of arms 172 (Fig. 1) which are severally secured at one end, to a horizontal rockshaft 174, while the opposite ends of said arms have pin and slot connections 176 with the lower ends of a pair of vertical rods 178 upon the upper ends of which the elevator platforms 66 are severally carried. The elevator platforms 66 are guided, in their up and down movements, by means of guideways 180 that are formed in members carried by a bracket 182 depending from a portion of the machine frame and through which the elevator supporting rods 178 extend. It will be noticed that the buffers 78 are secured at their lower extremities to the vertical rods 178 whereby the buffers are prevented from yielding under the pressure of the stack of articles on the conveyer 20. The rockshaft 174 extends transversely of the machine and is journaled in bearings in the opposite side frames 40. The rockshaft 174 projects beyond the side frame 40, on the side of the machine to which the wrappers are supplied, and to this projecting end of the rockshaft is secured an upwardly extending arm 184, as shown in Fig. 14. The upper portion of the arm 184 is provided with a longitudinal groove 186 to receive a rectangular slide-block 188 that is pivotally mounted upon a crank-pin 190, the latter being carried by a crank-arm 192 that is secured to one end of the shaft 50. With this construction, the arm 172 is continuously oscillated in such a way as to cause no jar or vibration of the machine. The arrangement of the parts is such that the crank-pin 190 passes dead center when the elevator is in its highest and lowest positions and as a result the reversal in the direction of movement of the elevator is slow enough to permit proper loading and unloading of the articles, thus avoiding the necessity of intermittently actuated elevator operating mechanism.

As the article and its wrapper are carried upwardly by the elevator 22, the portion of the wrapper lying upon the top face of the article is pressed firmly against said face by a presser-foot 200 (Figs. 1 and 19) which prevents relative movement between the wrapper and the article. The presser-foot 200 is carried at the lower end of a vertical stem 202 that is suitably supported and guided in a tubular guideway 204 which is formed in a fixed longitudinal beam 238 which latter extends longitudinally and centrally between the side frames 40 and is supported on the cross rods 240. The cross rods 240 connect opposite side frames 40 of the machine. A fixed abutment is provided for the packages moving up on the elevator 22 which comprises a pair of stop plates 205 (Fig. 1) one at each side of the yielding presser-foot 200. The stop plates 205 are carried on fixed longitudinal bars 304, supported from cross rods 305, extending from the central beam 238 (see Fig. 9). The stop plate 205 assists in positioning the article vertically preparatory to its delivery to the feed table 32.

During the rise of the article upon the elevator, a portion of the wrapper is engaged by a fixed folding member 206 consisting of a transverse bar hung from a fixed portion 239 depending from the beam 238. One end of the bar 206 is bent at right angles as shown in Fig. 2, and is secured to the frame of the machine. The folding member 206 serves to press the wrapper against the side of the article as the latter rises past said member. The wrapper at the opposite side of the article is engaged by a folding member in the form of a gate 208 which is pivoted at 210 to the receiving end of the feed table 32. The gate 208 functions in a manner similar to that of the member 206 to press the wrapper against the respective side of the article as the wrapper is fed upwardly past the gate by the rise of the article on the elevator. Thus, the wrapper is folded closely and smoothly against the sides of the article and is drawn tightly over the top face thereof.

At this stage of the wrapping operation the article is located in the position indicated by the numeral I in Fig. 1, with the opposite end portions of the wrapper hanging loosely below the article. One of said end portions is comparatively short and is indicated by a dotted line at *a*, while the opposite end portion of the wrapper is substantially as long as the width of the bottom face of the article which it is to cover and is indicated by a dotted line at *b*. As the elevator starts to descend the article is supported in position I, by a horizontal folding blade 214 which is normally located at the side of the article facing the receiving end of the machine and which is adapted to advance beneath the article, said elevator platform being constructed with a step 215 at the forward edge (see Fig. 19) to permit said folding blade to advance a short distance beneath the article while the elevator is in its uppermost position. The folding blade 214 operates to fold the depending flap *a* of the wrapper against the lower face of the article, the appearance of said flap, when thus folded being indicated at *a* in Fig. 4. For the above purpose, the folding blade 214 is shaped as best shown in Fig. 2 and is secured to the lower sides of a pair of slide members 217 which are mounted for horizontal reciprocation on opposite sides of a guide bar 218, the latter being carried by the portion 238′ of the fixed central beam 238. The folding blade 214 is notched as indicated at 214′ to permit the passage therethrough of the presser foot 200 as the latter drops by gravity after an article has been advanced from the elevators to the feed table. The means for actuating the folding blade 214 includes various elements of the mechanism for actuating the transporters 30 and accordingly a description of said folding blade actuating means will be postponed until the means for actuating the transporters has been described.

To insure the smooth folding of the wrapper over the edge of the article across which the folding blade 214 reciprocates, a pair of spring-pressed followers 220 (Figs. 1 and 2) are carried adjacent the upper face of said folding blade and the ends of said followers are adapted to engage the vertical side of the article adjacent said edge. To this end the followers 220 are constructed and mounted as best shown in Fig. 1. As therein shown, the followers 220 are arranged in parallelism and are connected at their rear ends by a cross web 221. A coiled spring 222 connects the cross web 221 with the folding plate 214, and the followers 220 are arranged to slide horizontally between the slide members 217 to which the folding blade 214 is secured. Normally the followers 220 are held by the springs 222 substantially flush with the front edge of the folding blade 214.

As the folding blade 214 advances, the leading edges of the followers 220 engage the adjacent wrapped side of the article along a narrow area immediately adjacent the lower edge of the article. The followers then are held against forward movement by the article and the spring 222 is stretched so that the wrapper is firmly pressed against the article when it is engaged by the edge of the folding blade. As the article subsequently starts to advance across the feed table, as will shortly be described, its bottom face slides over the folding blade 214 and there is a tendency for the portion *a* of the wrapper to be displaced rearwardly as it rides over the folding blade. However, the spring-pressed followers 220 then move relatively to the folding blade to follow up the article and offset the tendency of said portion of the wrapper to become displaced. This arrangement insures that the wrapper will be smoothly and closely folded over the above mentioned edge of the article.

The succeeding stages of the wrapping operation are performed as the partially wrapped article is advanced, in the direction of the arrow 224 in Fig. 1, across the feed table 32. The articles are advanced across the feed table 32 by means of the transporter 30 which, although it is continuously operative, is moved into and out of engagement with the articles at each cycle of its operation so as to advance the article step-by-step. Further, the transporter 30 is so constructed that after the machine has been once primed, the transporter operates upon a series of articles which are spaced apart along the feed table, to simultaneously advance each article of the series through step movements of equal length. As the articles of the series are thus simultaneously advanced, or while they remain at rest during the periods between successive movements thereof, various folding devices operate to effect the folding of different portions of the wrapper.

The transporter 30, as best shown in Figs. 1, 9, and 19, comprises a pair of bars 230 each having a series of fingers extending perpendicularly from one of their longitudinal edges, the fingers of one of these bars being indicated at A, B, C, D, E, and F, respectively, in Fig. 1. As shown the transporter bars are supported horizontally in the machine with the fingers depending vertically therefrom. These transporter fingers project successively at spaced intervals from the transporter bars 230 and are adapted to engage the rear sides of the article. The transporter bars 230 are spaced laterally apart and so arranged relatively to said articles that said fingers will engage adjacent the opposite ends of the articles.

The transporter bars 230 are severally pivotally mounted upon the opposite ends of two parallel horizontal rods 232 (Fig. 9) which extend transversely of the machine just above the transporters. The pivot-rods 232 are supported by two links 234, said links having ears depending therefrom, intermediate their ends, through which the central portions of the rods 232 severally extend and in which said rods are adapted to turn freely. The supporting links 234 are severally pivotally connected, at one end, to the upper extremities of two arms 236, the latter, in turn, having their lower ends pivoted at 236′ to the fixed beam 238. The opposite ends of the links 234 are pivoted upon crank-pins carried by two crank-arms 242 severally secured to horizontal crank-shafts 244 and 246 that are disposed in the same horizontal plane and are journaled in bearings formed upon the inner faces of one of the side frames 40. The crankshafts 244 and 246 are connected to rotate in unison by means of a link 248 pivoted at one end to a stud 249 carried by a disk 250 that is fast upon the shaft 244, and at its opposite end to a stud 249′ on disk 252 that is secured to the shaft 246.

The crank-shafts 244 and 246 are rotated by driving connections with the continuously rotating shaft 50. To this end, the crankshaft 246 carries a sprocket wheel 254 which is connected by a sprocket chain 256 with a similar sprocket wheel 258 carried by a transverse shaft 260, the latter being journaled in the frame of the machine below the shaft 246. The shaft 260 is connected to be driven by the shaft 50 by intermeshing spur gears 262.

The rotation of the disk 250 is also utilized to actuate the folder blades 214. To this end, a link 262 is pivoted at one end upon the stud 249 carried by said disk while the opposite end of said link is connected to the upper end of an arm 263 that is fixed to a shaft 264 journaled in the side frames 40. The shaft 264 also has secured thereto an arm 266 and the lower end of this arm is connected by a link 268 with the slide block members 217 that carry the folder plate 214.

It will be seen from an examination of Fig. 1 that the crank 242, the link 234 and the arm 236 associated with one end of each transporter bar are respectively equal in length and disposed in parallel relation to the corresponding parts associated with the opposite ends of the transporter bars, and consequently said parallel relations will be maintained irrespective of the radial positions of the cranks 242. Consequently, although the distance between the crank-shafts 244 and the corresponding pivot rod 232 continually varies, the distance between the crank-shaft 246 and the other pivot 232 varies concurrently to the same extent so that at any particular time in a cycle of operations, said distances are equal to each other and therefore the transporter bars are constantly maintained horizontal and the transporter fingers at all times extend vertically. Furthermore the construction and arrangement of the parts is such that each transporter is constrained to travel in a substantially horizontal path throughout the portion of its orbit in which it is advancing toward the delivery end of the machine.

The path of movement of one of the transporters is illustrated diagrammatically in Fig. 12. In this figure, the path of one of the pivot rods 232 is indicated by dotted lines at 270. Since the other pivot rod 232 travels through a similar path, the path indicated is illustrative of the path of the transporter bars themselves and, as shown, the portion of that path traveled by the transporter during the advancing portion of its movement is substantially horizontal, as above mentioned.

The above described horizontal movement of the transporter is an important feature of the invention inasmuch as it practically eliminates relative movement between the transporter fingers and the articles while the latter are being advanced by the former and thus causes the transporter to feed the articles more effectively than would be possible if the transporter fingers were permitted to move vertically as they advanced. The practical elimination of relative movement between the transporter finger and the articles fed thereby obviates any tendency of the fingers to displace or wrinkle the wrappers, as the articles are being fed.

By referring again to the diagrammatic representation of the orbit traveled by the transporters it will be seen that during the return movement of the transporters, after they have been effective to advance an article, they are lifted considerably above the plane which they occupied during the feed movement thereof. This movement of the transporters permits the transporter fingers to pass rearwardly over the tops of the series of articles upon the feed table 32 so that they may be lowered into feeding position with the finger A behind the article just raised by the elevator and each of the other transporter fingers engaging an article which is one step ahead of the article engaged thereby at the proceeding cycle of operations.

The article raised by the elevator is first engaged and advanced by the fingers A of the transporter bars in order that it may be moved from position I to position II. During this movement, the spring-pressed followers 220 follow up the rear side of the article, as already described, to insure a smoothly wrapped lower corner by preventing the portion *a* of the wrapper which was folded against the bottom face of the article from being displaced by its movement across the folding plate 214. Also, during this movement, the pivoted gate 208 is swung into a recess 272 in the feed table 32 and out of the path of the advancing article. The advance of the article onto the feed table causes the downwardly hanging extension *b* of the wrapper to be drawn over the upper edge of the receiving end of the feed table and then pressed thereby smoothly across the lower face of the article. This portion *b* of the wrapper is of such width that the edge thereof last brought into contact with the article will overlap the portion *a* of the wrapper previously folded against the bottom of the article and inasmuch as the line of paste hereinbefore mentioned was applied to the portion *b* of the wrapper adjacent said edge, said portion *b* will now be pasted to the portion *a* which it overlaps.

The wrapper has now been wrapped around the article so as to completely cover four sides thereof, the two ends alone remaining exposed, and the wrapper extends beyond the opposite ends of the article at all four sides thereof. The area of each end extension or flap of the wrapper is considerably less than the area of the corresponding end of the article so that the wrapper extensions if folded over the ends of the articles would fail to enclose more than the marginal portions of said ends. During the succeeding steps in the progress of the article across the feed table, the end extensions of the wrapper are first folded to cover the marginal portions of the ends of the article and then a label is applied to each end of the article to complete the wrapping thereof.

The movement of the article from position II to position III is an idle movement effected by the fingers B of the transporters. The next step movement of the article carries it from position III to position IV. This movement is effected by the finger C and as this finger moves into position to initiate said movement, the portions of the wrapper extending beyond the rear sides of the article are folded over against the ends of the article. The portion of the wrapper extension which is to be thus folded at one end of the article is indicated at *e* in Fig. 4.

To fold the rear side extensions of the wrapper, the finger C of each transporter carries folded plates 276 which are secured to the outer sides of said finger and are adapted to overlap the ends of the articles as the transporters are advanced. As the transporter fingers are swung into position at the rear of an article in position III, each folder plate 276 moves through a path indicated by the descending arrowheads in the dotted line path 270 of Fig. 12. As the folder plates 276 move in this path, the advancing curved edges thereof engage the outwardly extending end flaps *e* at opposite ends of the article and fold them as indicated in Fig. 5. The portions adjacent the curved edges of the folder plates 276 may also be curved outwardly from a vertical plane so as to avoid injuring the wrapper by coming too abruptly into contact therewith. The inner faces of the folder plates 276 are arranged to closely embrace the ends of the article so that the end flaps will be folded smoothly and drawn tightly across the corners of the article past which they advance.

The bottom extension of the wrapper, which severally consist of the extensions of the portions *a* and *b* that were previously folded over the bottom face of the article, are next folded over the opposite ends of the article. This folding operation occurs while the article remains at rest on the feed table in position III and while the transporters are rising and returning preparatory to performing their next feed movement. The folding of the bottom end extensions is effected by means of a pair of vertically movable folding plates 278 one at each side of the machine and severally carried by slide blocks 280, the latter being guided by means of suitable vertical guide-rods 282 depending from the feed table. The slide blocks 280 are adapted to be reciprocated upon the guide-rods 282 to cause the folder plates 278 to move to and from operative positions. When operatively positioned, the folder plates 278 closely overlap the opposite ends of the article and in moving into this position they fold the bottom end flaps of the wrapper upwardly against the ends of the article, the folded extensions then having the appearance of the extension *g* in Fig. 5. The rising and falling movements of the folder plates 278 are timed to take place before the folder blades 276 carried by the transporters swing into position for folding the end extensions *e* in order to avoid any conflict between said folder members. To effect the reciprocation of the slide blocks 280, carrying the folded plates 278, said blocks are connected by links 284 with the oscillatory arms 172 already described. The oscillation of the arms 172, therefore raises and lowers the folder plates 278 simultaneously with the up and down movements of the elevators 22.

After the folding operation, just described, has been completed, the article is next moved to position IV by the fingers D of the transporter. In moving from position III to position IV, the forward end extensions of the wrapper at the advancing side of the article, one of which is indicated at *h* in Fig. 5, are folded. The folding of the extensions *h* is effected by the advance of the article between stationary folder plates 288 which rise at opposite sides of the feed table 32 and are rigidly supported in any suitable manner. As the article is advanced between the stationary folder plates 288 the end extensions *h* are folded closely against the ends of the article until they appear as represented in Fig. 6.

In addition to the folding operation just described, the horizontally projecting upper end extensions of the wrapper, one of which is shown at *j* in Fig. 5, are first bent upwardly, as indicated in Fig. 6, and later are folded downwardly against the ends of the article, as indicated in Fig. 7. The preliminary upward folding of the upper end extensions *j* is effected by the inclined edges 290 on the folding plates 288. These edges 290 engage the outwardly directed end extensions *j* as the article advances and cause the extensions *j* to be bent up sharply until they assume the positions illustrated in Fig. 6 wherein one of the folding plates 288 and its inclined edge 290 is shown by dotted lines.

The further operation of folding the upper end extensions of the wrapper down against the article occurs during the next step movement of the article which advances it from position IV to position V, this movement being effected by the transporter fingers E. To accomplish this final downward folding of the upper end extensions, each folding plate 288 has mounted thereon a folding member 292. As shown in Figs. 1 and 14, the folding members 292 are of irregular elongated shape and one end of each member is pivoted upon a stud 294 which projects from the outer side of the respective folding plate 288, just at the rear of the inclined edge face 290. From its pivoted end each folding member 292 rises vertically to a point above the top face of the articles on the feed table and then extends forwardly toward the delivery end of the machine, and downwardly to provide a downwardly inclined folding face 295 on its under side. The forward extremity of the folding member 292 is connected with the forward portion of the folding plate 288 by a vertical stud 296 (Fig. 14) which extends through said member and is threaded at its lower end into the plate 288. A spring 298 is arranged around the stud 296 so as normally to force the rear end of the folding member 292 downwardly against the adjacent portion of the plate 288. As the upstanding end extensions *j* of the wrapper advance beyond the inclined folding edges 290 they reach cut away portions 299 of the folder plates 288. Thereupon the wrapper extensions *j* tend to return to their original horizontal positions and in so doing they project across the vertical planes of the inclined folding edges 295. These wrapper extensions are then engaged from behind by the inclined folding edges 295 and are folded down by said edges until the extensions finally wipe across the inner side faces at the rear ends of the folding members 292 and are pressed thereby against the ends of the article.

Each folding member 292 is also provided with a horizontal lip 300 which projects from its inner side and is adapted to overlie the upper face of the article adjacent its opposite ends (see Fig. 15). The springs 298 permit the lips 300 to be lifted slightly as the article is forced beneath the latter. The end portions of the lips 300 which are first engaged by the article, are beveled as shown at 302 in Fig. 14, to permit the article to force its way beneath said lips. It will be obvious that the resiliency of the springs 296 will permit the lips to yield upwardly as the article is forced beneath them, the members 292 tilting about the pivot studs 294 as the lips rise. As the ends of the article pass beneath the lips 300 the latter are pressed downwardly against the ends of the article and prevent any possible wrinkling or displacement of the upper end extensions due to the wiping of said extension across the faces of the members 292 while said extensions are being pressed thereby against the ends of the article. Thus the lips 300 insure that the wrapper will fit closely at the opposite edges of the upper faces of the article. To avoid conflict between the lips 300 and the fingers E of the transporters as said fingers advance past the folding members 292 said fingers may be grooved as indicated by dotted lines at 293 in Fig. 21.

As an article advances from position I until it reaches position V where it engages the lips 300, the upper face of the article rides beneath a series of pressure plates 303 (Figs. 1 and 22) which are mounted adjacent the under sides of the pair of longitudinal bars 304 which are arranged at opposite sides of the beam 238. The pressure plates 303 are supported by vertical studs 306 which pass freely through apertures in the beams 304 and are threaded at their upper ends to receive nuts 307 which bear against the upper faces of said beam to limit the downward movement of the pressure plates. The pressure plates are pressed downwardly by springs 308 which are coiled around the supporting studs 306 between the plates and the beams 304 and permit the pressure plates to yield upwardly as the articles pass beneath them. Each transporter bar also carries three presser plates 309 which are urged downwardly by suitable springs against the upper faces of the articles as the end extensions of the wrappers are being folded. The pressure plates 303 and 309 serve to prevent upward displacement of the articles so that the several wrapper extensions of all the articles operated upon will be presented in the same relative positions to the action of the various folding devices. In this way the pressure plates 303 and 309 facilitate the production of uniformly wrapped articles.

The folding of the wrapper has now been completed and the opposite ends of the article appear as illustrated in Fig. 7. As shown, the ends of the article are not completely covered by the wrappers however, and the next operation to be performed is the application of the labels to the ends of the articles to completely enclose the articles and to seal the ends of the wrapper.

The labeling operation takes place during the feeding of the articles across the feed table from position V to position VI, (see Fig. 15). This feed movement is effected by the fingers F of the transporters. The labels are applied simultaneously to the opposite ends of the article during this feed movement, by the label-applying mechanisms 34.

The label-applying mechanisms, indicated generally as 34 are arranged in duplicate, one at each side of the machine. Both label-applying mechanisms are identical in construction and mode of operation and accordingly only one of them will be hereinafter described specifically.

Each label-applying mechanism 34, comprises a magazine 310 for holding a supply labels, and a label-affixing device 312, in the general form of a drum, which is rotatable about a vertical axis between the magazine and the feed table 32. The device or drum 312 is provided with nippers for seizing a label in the magazine and causing it to be withdrawn therefrom, and the drum is rotated in such a manner that the label will be drawn over a portion of the cylindrical shell of the drum and later rolled against the end of an article by the rotation of the drum as the article is advanced into engagement therewith. The label-affixing drum is provided with three label-seizing nippers and is intermittently rotated through steps of one hundred and twenty degrees and the nippers are successively caused to seize the end of a label at each stopping position of the drum. A label is removed from the magazine 310 in one partial rotation of the drum and affixed to an article at the next partial rotation of the drum.

The labels are supported on the edge in the magazine 310 between a front plate 314 (Fig. 17) and a follower 316, the latter being constantly urged in a forward direction by any suitable means to advance the stack in the magazine as the labels are successively removed from the forward end thereof. The front plate 314 is cut away at one edge to provide a space 318 through which the foremost label may be removed from the magazine, (see Fig. 17). The labels are acted upon, one at a time, by means of a vertically disposed suction tube or plate 320 which is mounted adjacent the opening 318 and which is operative to move the forward edge of the margin of the foremost label into the field of operations of the nippers of the label-affixing drum 312. The drum 312 comprises three segmental plates 326 which are concentrically mounted on a vertical rotary shaft 328. Each plate 326 terminates at one of its vertical edges in a fixed jaw 330 that is adapted to cooperate with a movable nipper 332 so that the edges of the labels may be seized thereby.

The suction tube 320 is illustrated in detail in Figs. 17 and 18 and may be of any well known construction, having a flattened perforated face against which the labels are to be drawn. The suction tube is adapted to be rocked about its vertical axis and is normally disposed in the angular position illustrated by dotted lines in Fig. 17. When in this position, the air is exhausted therefrom and the marginal portion of the foremost label in the magazine 310 will be drawn against the perforated face of the suction tube. The suction tube is then rotated into the angular position shown by full lines in Fig. 17, swinging said marginal portion of the label outwardly into position to be grasped by one of the gripper fingers or nippers 332 carried by the label-affixing devices 312. Inasmuch as the device 312 carries three nippers, the cam by which the suction tube is oscillated is designed to swing the suction tube forwardly three times at each revolution of the drum. This cam is fixed to the drum 312 as shown at 322 in Fig. 15 and is cooperatively engaged by a cam roll 323 carried by an arm 324 projecting from the suction tube.

The two label-affixing mechanisms 34 are adjustable toward and from the feed table 32 in order that they may be adapted to apply labels to the opposite ends of articles of different lengths. To this end, said mechanisms 34, together with the actuating means therefor are mounted on independent frame sections or plates 333 and 334, these frame sections being supported for sliding movements transversely of the machine. For this purpose one end of each of the frame sections 333 and 334 is provided with a transverse guideway 335 (Figs. 14, 15, and 21) adapted to be slidably or adjustably mounted on a transverse supporting bar 336 the opposite ends of which are rigidly secured to the side frames 40, while the opposite ends of said frame sections are supported by and adapted to slide longitudinally of a tie-rod 337 which connects the side frames 40. To adapt other parts of the machine to operate upon articles of different lengths various adjustments of operating parts may be secured merely by the removal of certain of the supporting rods or other supporting members and the substitution therefor of rods or members of the required lengths or sizes. Each nipper 332 is carried by a vertical rockshaft 338 and is constantly urged into cooperative relation with its respective fixed jaw 330 by a spring 339 acting upon an arm 340 fixed to the rockshaft 338. At its lower extremity each rockshaft 338 has affixed thereto a lateral projection 341 (Fig. 16) adapted to ride against the periphery of a stationary cam 342. With this construction the nippers 332 will be opened by the action of the cam 342 before they are moved by the rotation of the drum into the position to seize a label and thereafter, as the projections 341 pass beyond the influence of the cam 342, the nippers are suddenly closed by their spring 339 to seize the label presented thereto by the suction tube 320. This last mentioned operation occurs just prior to the completion of each rotary step movement of the label-affixing drum which almost immediately thereafter comes to a complete stop. The nippers are thus enabled to securely grip the labels and inasmuch as the start of each step movement of the drum is comparatively slow as will hereinafter be explained, there is no tendency for the nippers to pull away from the labels. The nippers or fingers 332 are preferably constructed of light spring steel and provision is made to insure the spring nippers against possibility of breakage due to continued bending thereof as they are suddenly brought into contact with the fixed jaws 330 by the force of the springs 339. To this end, a rigid finger 345 (Fig. 17) is secured to each rock shaft 338 and this finger carries a stop screw 347 which is adapted to co-operate with a stop shoulder 349 on the drum to take the shock of the closing movement of the nipper. The screw 347 is adapted for adjustment so that when the nipper has closed, it will yield sufficiently to firmly grip the label but not enough to bend itself to any appreciable extent and consequently there is no tendency for it to become weakened from continued use.

The means for exhausting air from the suction tubes 320 consists of a pump 343 (Fig. 3) comprising a cylinder pivoted at 344 to a rigid portion of the machine. The pump cylinder 343 is provided with a piston (not shown) adapted to reciprocate therein. The pump piston is provided with a piston rod 345′ which is connected directly with the nearer of the two links 236 of the transporter mechanism. The pump is connected by a flexible hose 346 with one end of each of the suction tubes 320. The arrangement is such that the suction stroke of the piston occurs during the advancing stroke of the transporters so that the suction tubes may be rendered operative during the partial rotations of the label-affixing drums which take place concurrently with the advance of the transporters. A flapper valve 346′ (Fig. 19) is provided in the pump cylinder 343 to break the suction when the machine is running and it is not desired to apply labels to the articles.

A coating of glue is applied to the outer faces of the labels as they are being rotated by means of the label-affixing drum from the magazine 310 into engagement with the ends of the articles on the feed table. To this end, a glue pot 347′ is suitably supported adjacent the label-affixing device 312 and a vertically disposed glue roll 348 is located in an opening in one of the side walls of the glue pot, the arrangement being such that when a label is fed by one of the segmental plates 326 toward the article on the feed table, the label will ride over the surface of said glue roll.

To insure the proper application of glue to the face of the label, the glue roll 348 is positively driven during the rotation of the label-affixing drum, by means of intermeshing gearing comprising a pinion 350 (Fig. 16), secured to the lower trunnion of the glue roll, and a gear 352, secured to the intermittently rotatable shaft 328. Preferably, the glue roll 348 is mounted with provision for a slight amount of adjustment toward and from the label-affixing drum, as, for example, by being carried upon a pivoted arm 354 adapted to turn on a pivot stud 356 and to be rigidly secured in adjusted position upon the pivot stud, as by the tightening of the head of the stud against the arm 354. It is intended to adjust the roll 348 so that it will be engaged by the outer face of a label fed past the roll by the rotation of the label-affixing drum but will not be engaged by the segmental plates 326 constituting the drum, if no label is present thereon. Thus the drum will not become smeared with glue, if for example, the supply of labels becomes exhausted or if, for any reason, the labels fail to feed properly.

The drums of the two label-applying mechanisms 34 are rotated through successive rotations of one hundred and twenty degrees each, by means of the following mechanism. A bevel gear 360 (Fig. 14) is secured to the lower ends of the drum shafts 328 of each of the label-applying mechanisms. Meshing with each bevel gear 360 is a bevel gear 362 that is secured to a transverse shaft 364, said shaft being journaled in bearings in the side frame members 40 and the gears 362 being located on the shaft adjacent the inner sides of said frame members. At one end of the shaft 364, near the outer side of the adjacent frame member 40 is secured a ratchet-wheel 366 having three notches equally spaced apart in its periphery. The ratchet wheel 366 is actuated by a pawl 368 which is pivotally mounted upon a pawl carrier 370 that is mounted to oscillate freely upon the shaft 364. The hub of the oscillatory pawl-carrier arm 370 has formed thereon a rack segment 372 and meshing with this rack segment is a rack 374 carried by a link 376. The link 376 is pivotally mounted at one end, upon a crank-pin 378 carried by a disk 380 which is fast upon one end of the shaft 260. The other end of the link 376 is provided with a longitudinal slot 382 through which the shaft 364 extends. The slotted end of the link 376 is confined between the ratchet-wheel 366 and a collar 377 that is secured to the end of the shaft 364. With the above-described construction, one-third of a revolution will be imparted to the shaft 364 at each rotation of the continuously operating shaft 260. It will be apparent that one-half of the rotation of the shaft 260 will be effective to advance the pawl 368 in a direction to effect partial rotation of the ratchet-wheel 372 and shaft 364, while during the succeeding half turn of the shaft 260 the pawl 368 will be retracted idly over the ratchet wheel and the label-affixing drums will remain at rest. It will also be seen that the arrangement of the crank-pin 378 and the connections to the shaft 364 are such that the label-affixing drums will start gradually from their positions of rest and reach a maximum rate of rotation at the middle of their feed movements. By reason of the slow start of rotation of the drums there is no tendency for the nippers carried thereby to be pulled out of holding engagement with the labels.

At the completion of that cycle of operations of the transporters 30 in which the labels are applied, the article which has just received the labels has reached position VI (Fig. 3) upon the feed table 32. The opposite ends of the article now appear as illustrated in Fig. 8. While the completely wrapped and labeled article remains at rest in position VI no further operation is performed upon it. At the succeeding cycle of the transporters, however, the article is advanced by the transporter fingers F between the belts 36 of the delivery conveyer. To insure that the article shall be properly positioned longitudinally for entrance between the opposed stretches of the belts 36, two vertical positioning plates 390 (Fig. 21) are provided adjacent the receiving ends of the belts, the plates being spaced apart just sufficiently to permit the article to be fed between them. In order that the freshly applied labels shall no be displaced or rubbed off from the ends of the article as the article is advanced between the positioning plates, the plates are constructed and arranged to engage the opposite ends of the article only along lines above and below the labels. To this end each positioning plate 390 is provided with upper and lower horizontal flanges 392 (Figs. 14, 19, and 21) which project inwardly to engage the ends of the article. These flanges are so located that the labels will not be engaged thereby as the article is fed toward the belts 36.

The delivery conveyer operates to advance the articles along an extension 386 of the feed table 32, while keeping the labels pressed against the ends of the articles during the setting or drying of the glue and finally to deliver the articles from the machine. The extension 386 of the feed table 32 is rigidly secured, at its inner end, to a portion of the frame, while its outer end is supported by a brace 388.

The two endless belts 36 of the delivery conveyer are arranged with their opposite stretches vertically disposed, one of said belts being located at each side of the machine. Each belt 36 passes over a pair of pulleys 394 and 396, the pulleys 394 being severally fixed to the upper ends of vertical shafts 398, that are journaled in bearings in the two adjustable frame sections 333 and 334, while the pulleys 396 are adapted to turn on posts rising from the feed table extension 386. To drive the conveyer belts, the pulleys 394 are rotated intermittently by mechanism comprising bevel gears 400, severally secured to the shafts 398, the lower extremities of the shafts 398 projecting below the frame sections 333 and 334 to receive said gears. Meshing with the gears 400, are bevel gears 402 which are fixed to a transverse shaft 404, the latter being journaled in the side frame members 40. The shaft 404 has secured thereto a ratchet-wheel 406 (Fig. 14) which is adapted to be actuated by a pawl 408 carried by an arm 409 projecting from a rocker member 410 that is mounted to oscillate on the shaft 404 between the ratchet-wheel 406 and a collar secured to the end of the shaft. A spring 411 is provided for maintaining the pawl 408 in engagement with the ratchet wheel 406. The pawl-carrying arm 409 and the rocket member 410 are rotated by means of connections with the oscillating pawl-carrying arm 370 through the medium of which the shaft 364 is rotated to actuate the label-affixing drums.

It will be obvious that as a newly wrapped article is being introduced between the belts 36 it is desirable to have the belts travel at a surface speed equal to the speed at which the articles are being advanced by the transporters in order to insure that there will be no tendency for the freshly applied labels to be displaced or wrinkled as might happen if the belts traveled at a different rate of speed from that of the articles. If, however, the belts 36 should start to advance as soon as the transporters start their advancing movements, it is clear that the articles between said belts would be separated from one another by distances equal to the spaces between the articles of the series being advanced by the transporters. This is undesirable since it would then be necessary to considerably increase the length of the delivery conveyer belts 36 in order to maintain the labeled ends of the articles under pressure until the glue is set. Consequently, although the shaft 404 derives its intermittent rotary motion from the oscillatory arm 370 which drives the shaft 364, the connections between the shaft 404 and the arm 370 are so constructed and arranged that the distance traveled by the belts 36 at each feed movement will be considerably less than the corresponding distance traveled by the articles which are being acted upon by the transporter. Furthermore, provision is made whereby the belts 36 are caused to advance at a comparatively slow rate of speed at the start of each feed movement thereof, while the article is being advanced from the feed table into the field of operation of the belts 36, and during the remainder of said feed movement, the belts are caused to advance at an increased rate of speed equal to the rate of advance of the transporter that is feeding the articles thereto. To this end, the ratchet-wheel 406 is provided with five equally spaced peripheral notches instead of three such notches as are provided in the ratchet wheel 366, and the connections between the pawl-carrier arm 370 and the rocker member 410 comprise a jointed link consisting of two sections 412 and 414 which are pivotally connected together at 416. The other ends of the link sections 412 and 414 are pivotally connected to the pawl-carrier arms 370 and 409, respectively. As shown, the pawl-carrying rocker member 410 is provided with a projection 418 carrying a laterally projecting stud 420. A spring 442 acts upon the rocker member 410 tending to rotate it in a direction to hold the stud 420 in engagement with the link section 414 so as to maintain the link sections 412 and 414 in angular relation to each other. With this construction the feed movement of the pawl-carrying arm 370, i. e., the oscillation of said arm toward the right, viewing Fig. 14, is transmitted to the rocker member 410 through the link section 414. During the first part of this feed movement of the pawl carrying arm 370 the stud 420 is held against the link section 414 by the force of the spring 442 so that the rocker member and the link section are held together so as to constitute, in effect, a single rigid arm connecting the link section 412 with the shaft 404, said arm being considerably longer than the arm 370 which connects the other end of the link section 412 with the shaft 364. Consequently, so long as the stud 420 is maintained in engagement with the link section 414, the rotation of the shaft 404 will be comparatively slow. During this part of the feed movement of the pawl 408 said pawl is permitted to lag behind the pawl 368 sufficiently to insure that the shaft 404 will be rotated only one-fifth of a revolution when the shaft 364 has been rotated one-third of a revolution. As the pawl-carrying arm 370 continues to oscillate toward the right, however, the link sections 414 and 412 become straightened and the stud 420 swings upwardly away from the link section 414. During the remainder of the feed movement of the arm 370, therefore, this movement is transmitted to the shaft 404 through the link sections 412 and 414 and through the arm 410. The arm 410 and the arm 370 are of equal length and consequently the shaft 404 will be rotated at the same rate of speed as the shaft 364. On the idle or return movement of the pawl-carrying arm 370, the feed pawl 408 is retracted by the action of the spring 442. At the beginning of this movement, the feed pawl 408 is retracted at the same rate of speed as the feed pawl 368. As soon, however, as the stud 420 is moved into engagement with the link section 414, the link section 414 and the rocker member 410 then become relatively fixed and the movement of the arm 370 is transmitted to the pawl-carrier arm 410 through said relatively fixed members which have already been described as constituting, in effect, a single rigid arm connecting the link section 412 with the shaft 404. Inasmuch as said rigid arm is of greater length than arm 370 the remainder of the return movement of the feed pawl 408 will be slower than the corresponding part of the return movement of the feed pawl 368. To prevent possibility of the pivot-pin 416 which connects the link sections from rising above dead center, a projection 421 on the link section 412 is arranged to engage a suitable abutment on the link section 414 when the jointed link comprising the sections 412 and 414 is straightened.

It will be seen that by means of the above described mechanism for actuating the delivery conveyer, the latter is advanced step-by-step in timed relation with the step-by-step rotation of the label-affixing drums, and that while the delivery conveyer is connected to be actuated directly by the actuating mechanism for said drums, nevertheless, said conveyer advances its articles, at each step movement, a shorter distance than the articles on the feed table are advanced by the transporter, and further, that the articles are advanced relatively slowly during the initial part of each feed movement of the feed belts 36 so as to reduce the spaces between the articles acted upon by the conveyer, and that during the latter part of each feed movement of the feed belts, the articles are advanced thereby substantially at the rate of speed of the articles on the feed table.

As the articles advance with the conveyer belts 36 the belts serve to press the labels against the ends of the articles to facilitate the setting of the paste. To insure that the labels will be subjected to uniform degrees of pressure throughout the length of the conveyer belts the inner stretch of one of the belts is backed up by the vertical flange of a rigid angle iron strip 424 (Figs. 21 and 23) carried by the extension 386 of the feed table while a series of short presser plates 426 are adapted to press against the inside face of the inner stretch of the conveyer belt. As shown, the presser plates 426 are arranged end-to-end and may be conveniently supported by a horizontal angle iron strip 428 that is rigidly secured to the extension 386, and in which the plates are guided for movements toward and from the face of the belt. Suitable springs 430 are interposed between the presser plates 426 and the angle iron strip 428 to supply the desired degree of pressure to the articles.

After reaching the end of the delivery conveyer, the articles are discharged therefrom and may be received in any suitable receptacle. When the articles leave the delivery conveyer the labels have been pressed against the ends of the articles by the conveyer belts 36 for a sufficient period of time to insure the setting of the paste. During this time the conveyer belts 36 and the articles have advanced together and there has been no relative movement between them. As a result the labels are properly centered upon the ends of the articles and present a smooth appearance.

While it is preferred to employ the specific construction and arrangement of parts shown and described it will be understood that this construction and arrangement is not essential except as defined in the claims and may be variously changed or modified without departing from the spirit and true scope of the invention.

Having thus revealed the nature of the invention, that which is claimed as new and desired to be secured by Letters Patent is.—

1. A wrapping machine having, in combination, a feed table, an elevator for raising articles to the level of the feed table, means for supplying an article to the elevator while in its lowermost position, a transporter for engaging the article when the elevator has been raised for transferring the article to the feed table and advancing it across the table, means for feeding a wrapper into position above the article and the elevator while the latter is lowered, means for causing said wrapper to be folded over the sides of the article during the rise of the elevator and the transfer of the article to the feed table, means for causing the wrapper to be held closely against the article adjacent a lower edge at one side thereof while the article is being transferred to the feed table, means separate from the transporter for folding the wrapper against the lower side of the article, and means for completing the wrapper folding operations while the article is being intermittently advanced across the table.

2. In a wrapping machine, the combination with a feed table, of means for raising an article to the level of the feed table adjacent one end thereof, means operating while said article is being raised to fold a wrapper about the top and opposite sides of the article, the wrapper extending below the bottom of the article at both sides thereof, a folder for folding the wrapper extension at the rear side of the article across the bottom thereof and temporarily supporting the article, a transporter for feeding the article sidewise from said supporting means and across the feed table thereby causing the wrapper extension at the front side of the article to be folded across the bottom thereof outside of said rear extension, and means carried by the folder for engaging the outside of the wrapper at the rear of the article and at a point adjacent the lower edge of said side and for following up the article as it is advanced onto the feed table to insure that the wrapper will be smoothly and closely folded over said edge of the article.

3. A wrapping machine having, in combination, an endless belt conveyer adapted to support a series of articles with their opposite ends projecting beyond the outer longitudinal edges of the conveyer belts and to feed the articles into the machine, elevator platforms for engaging the projecting ends of the articles and raising the articles singly above the conveyer belt, means for feeding a wrapper above the article on the elevator and for folding it over the sides of the article as it is being elevated, means for engaging the lowermost face of the article and supporting the article after it has been elevated to permit the descent of the elevators, means to engage and advance the article, and means for completing the folding of the wrapper around the article.

4. A wrapping machine having in combination, endless belt conveyers adapted to support a series of articles with their opposite ends projecting beyond the outer longitudinal edges of the conveyer belts and to feed the articles into the machine, elevator platforms for engaging the projecting ends of the articles for raising the articles singly to the level of the feed table, a feed table, means for positioning a wrapper above the article and elevator, means for folding the wrapper about three sides of the article during its elevating movement, a folder for folding the wrapper about a fourth side of the article and for supporting the said article to permit the descent of the said elevators, the said elevators being provided with recesses in the top sides thereof to permit the folder to move to an article supporting position while the elevators are supporting the article.

5. In a wrapping machine, a feed table, a transporter for engaging and feeding across said table a rectangular article having a wrapper enclosing its four sides and projecting beyond its opposite ends, the transporter moving through an orbit substantially without a vertical component of motion while in engagement with the article, means on the transporter for folding one side of the projecting portions of the wrapper against the end of the article and means for folding the other sides of said projecting portions of the wrapper against the ends of the article.

6. In a wrapping machine, the combination with a feed table, of means for raising an article to the level of the feed table adjacent one end thereof, means operating while said article is being raised to fold a wrapper about the top and opposite sides of the article, the wrapper extending below the bottom of the article at both sides thereof, a reciprocating folding blade, means for advancing said folding blade edgewise beneath the article to engage the rear wrapper extension and fold said extension across the bottom of the article and temporarily to support the article, means for feeding the article sidewise from said folding blade onto and across the feed table, thereby causing the front wrapper extension to be folded across the bottom of the article outside of said rear extension, and a follower movable relatively to said folding blade for yieldingly engaging the wrapper at the rear side of the article adjacent the lower edge of said side and following up the article as the latter is fed from said folding blade to the feed table to prevent the first folded wrapper extension from becoming displaced rearwardly.

7. In a wrapping machine, the combination with a feed table, of means for raising an article to the level of the feed table adjacent one end thereof, means operating while said article is being raised to fold a wrapper about the top and opposite sides of the article, the wrapper extending below the bottom of the article at both sides thereof, a reciprocating folding blade, means for advancing said folding blade edgewise beneath the article to engage the rear wrapper extension and fold said extension across the bottom of the article and temporarily to support the article, a transporter for feeding the article sidewise from said folding blade onto and across the feed table, thereby causing the front wrapper extension to be folded across the bottom of the article outside of said rear extension, mechanism for actuating the transporter, and a follower actuated by the said mechanism and movable relatively to said folding blade for yieldingly engaging the wrapper at the rear side of the article adjacent the lower edge of said side as the folding blade is advanced and for following up the article as the latter is fed from said folding blade to the feed table to prevent the first folded wrapper extension from being displaced rearwardly.

8. In a wrapping machine, a feed table, a transporter for advancing an article of prismatic shape and rectangular cross-section across said table, yielding members carried by the transporter that are adapted to press the articles against the table, the article having a wrapper enclosing its four sides and the wrapper having tubular extensions projecting beyond the opposite ends of the article, folding members carried by the transporters for folding one side of the tubular wrapper extensions against the ends of the article, a member movable relatively to the transporter for folding another side of said tubular extensions against the ends of the article, and means for folding the other sides of said extensions against the ends of the article.

9. In a wrapping machine, devices for folding a wrapper over the top and two sides of an article, means for folding the wrapper over the bottom of the article, said means being adapted to support the article after the folding operation, leaving tubular end extensions projecting beyond the ends of the article, a feed table, a transporter movable through an orbit with a parallel motion and having fingers for advancing the partially wrapped article across the feed table, a pair of reciprocating folder plates operative to fold the extensions at the lower side of the article, means comprising folding plates carried by the transporter for folding the rear extensions of the wrapper against the opposite ends of the article, a pair of stationary members for effecting the folding of the wrapper extensions at the front of the article as said article is fed past said members, and means for folding the extensions at the upper side of the article.

10. A wrapping machine having, in combination, a guideway for the articles to be wrapped, a transporter having a plurality of spaced fingers adapted to engage successively the rear of an article to advance it through the guideway, a rotating crank, a member connected at one point to the crank and at another point to the transporter, a passive guide for directing the motion of said member under the driving force of the crank, and means for constraining the transporter for substantially parallel motion, said mechanism being all so proportioned that the transporter is moved bodily with its fingers traveling through an orbit having a substantially straight portion extending along the guideway.

11. A wrapping machine having, in combination, a guideway for the articles to be wrapped, a transporter having a plurality of spaced fingers adapted to engage successively the rear of an article to advance it through the guideway, a pair of spaced rotating cranks, means connecting the cranks for simultaneous rotation, a pair of members, each connected at one point to one of the cranks and at another point to the transporter, and passive guides for directing the motion of said members under the driving force of the cranks, said mechanism being all so proportioned that the transporter is moved bodily with a substantially parallel motion and with its fingers traveling through an orbit having a substantially straight portion extending along the guideway.

12. A wrapping machine having, in combination, a guideway for partially wrapped articles, a transporter having a plurality of spaced fingers adapted to engage successively the rear of an article to advance it through the guideway, a parallel motion linkage connected to the transporter constrained for motion to impart to the transporter fingers a motion through an orbit including the guideway, and wrapper folders carried by the transporter to fold one side of the wrapper end extensions against the article, said linkage being so proportioned that there is substantially no relative motion between the fingers and the article during the portion of the orbit of the fingers when they are advancing the article.

13. In a wrapping machine, means for folding a wrapper about an article leaving tubular extensions at the ends thereof, means for folding the extensions against the ends of the package leaving an open space between the edges of the folded extensions, means for advancing the article and wrapper through the folding means, and means operable during the advancement of the article therepast for applying a label to the said folds to secure the same against the article in their unjoined condition.

14. In a wrapping machine, means for folding a wrapper about an article leaving tubular extensions at the ends thereof, means for successively folding the said extensions against the ends of the article leaving the marginal edges of the said extensions spaced apart in an unjoined relation, means for advancing the article and wrapper through the folding means, and means operable during the advancement of the article therepast for applying a label to the folded extensions to secure the same in their unjoined relation.

15. In a wrapping machine, means for folding a wrapper about an article leaving tubular extensions, means for folding the tubular extensions against the sides of the article, the said extensions being unsecured and spaced apart to form an open space at the ends of the article, means for advancing the article and wrapper through the folding means, and means operable during the advancement of the article therepast for applying a label to the ends of the article and folded extensions, the said open space being provided to permit the said label to be secured to the end of the article and to the folded wrapper extensions.

16. A wrapping machine comprising in combination, a belt conveyer adapted to support a portion of each of a series of articles, an elevator platform for engaging the unsupported portion of the article and raising the articles singly to the level of a feed table, a feed table, means for positioning a wrapper above the article, means for folding the wrapper about three sides of the article during its elevating movement, a rigid wall and a yieldable member for engaging opposite sides of the article to position the same in the plane of the table when delivered thereto by the elevator and a folder for folding the wrapper about the fourth side of the article and a member for moving the article and wrapper along the table.

17. In a wrapping machine, means for feeding a series of articles, means for positioning a wrapper above an article, a transfer to remove the article from the first named means, a receiving pocket having a spring pressed side to hold the article and wrapper to permit withdrawal of said transfer, a feed table to receive the article and wrapper, a carrier for moving the article and wrapper along said table and cooperating with the table for folding the wrapper against the lower side of the article, folders associated with the feed table for folding the wrapper against the ends of the article as the article and wrapper are fed therepast.

In testimony whereof we have affixed our signature.

ELMER L. SMITH.
FREDERIC B. FULLER.